United States Patent [19]

Fries et al.

[11] Patent Number: 5,226,256
[45] Date of Patent: Jul. 13, 1993

[54] WINDOW SYSTEM FOR A BUILDING

[75] Inventors: Wolfgang Fries, Münster; Paul Greisner, Telgte; Dieter Renz, Ibbenbüren, all of Fed. Rep. of Germany

[73] Assignee: Aug. Winkhaus GmbH & Co., KG, Telgte, Fed. Rep. of Germany

[21] Appl. No.: 850,007

[22] Filed: Mar. 10, 1992

Related U.S. Application Data

[63] Continuation of Ser. No. 522,186, May 11, 1990, abandoned.

[30] Foreign Application Priority Data

May 12, 1989 [DE] Fed. Rep. of Germany ....... 3915569

[51] Int. Cl.$^5$ ............................................. G08B 13/08
[52] U.S. Cl. .......................................... 49/13; 49/21;
49/24; 49/29; 49/31; 49/192
[58] Field of Search .................... 49/13, 14, 21, 24, 29, 49/30, 31, 125, 138, 192; 307/116, 118

[56] References Cited

U.S. PATENT DOCUMENTS

| | | | |
|---|---|---|---|
| 2,067,106 | 1/1937 | Tashjian et al. | 49/24 X |
| 2,198,488 | 4/1940 | Smith | 49/21 X |
| 2,994,525 | 8/1961 | Onksen et al. | 49/21 |
| 3,456,387 | 7/1969 | Tolson . | |
| 3,561,160 | 2/1971 | Chan | 49/14 X |
| 4,062,314 | 12/1977 | Allen et al. | 49/13 X |
| 4,121,382 | 7/1977 | Dietrich . | |
| 4,237,654 | 12/1980 | Landem et al. | 49/13 X |
| 4,304,070 | 12/1981 | Musacchia | 49/13 X |
| 4,309,585 | 1/1982 | Doi et al. | 49/13 X |
| 4,338,526 | 7/1982 | Martin . | |
| 4,433,274 | 2/1984 | Duhame | 49/31 X |
| 4,533,901 | 8/1985 | Lederle | 49/28 |
| 4,533,905 | 8/1985 | Leivenzon et al. | 49/14 X |
| 4,544,865 | 10/1985 | Sharp . | |
| 4,652,862 | 3/1987 | Verslycken | 49/14 X |
| 4,722,151 | 2/1988 | Westwell | 49/14 X |

FOREIGN PATENT DOCUMENTS

| | | |
|---|---|---|
| 0168520 | 1/1986 | European Pat. Off. . |
| 1584172 | 5/1965 | Fed. Rep. of Germany . |
| 1516591 | 12/1966 | Fed. Rep. of Germany . |
| 1584164 | 4/1969 | Fed. Rep. of Germany ......... 49/21 |
| 1811400 | 6/1970 | Fed. Rep. of Germany . |
| 2231092 | 6/1972 | Fed. Rep. of Germany . |
| 2515983 | 4/1975 | Fed. Rep. of Germany . |
| 3000579 | 1/1980 | Fed. Rep. of Germany . |
| 3119103 | 5/1981 | Fed. Rep. of Germany . |
| 3013851 | 9/1981 | Fed. Rep. of Germany . |
| 3111711 | 10/1982 | Fed. Rep. of Germany . |
| 3244188 | 11/1982 | Fed. Rep. of Germany . |
| 3334810 | 9/1983 | Fed. Rep. of Germany . |
| 1336645 | 10/1983 | Fed. Rep. of Germany . |
| 3336645 | 10/1983 | Fed. Rep. of Germany . |
| 3223808 | 12/1983 | Fed. Rep. of Germany . |
| 3625555 | 7/1986 | Fed. Rep. of Germany . |
| 3514223 | 10/1986 | Fed. Rep. of Germany . |
| 3515945 | 11/1986 | Fed. Rep. of Germany . |
| 3805426 | 2/1988 | Fed. Rep. of Germany . |
| 3717364 | 9/1988 | Fed. Rep. of Germany . |
| 8907144 | 6/1989 | Fed. Rep. of Germany . |
| 324607 | 8/1984 | Switzerland . |
| 2146063 | 8/1984 | United Kingdom . |
| 2159571 | 5/1985 | United Kingdom . |

Primary Examiner—Peter M. Cuomo
Assistant Examiner—Jerry Redman
Attorney, Agent, or Firm—Anderson, Kill, Olick & Oshinsky

[57] ABSTRACT

A window system is proposed in which windows (41) which can be both locked and tilted mechanically are connected via microprocessors (43) to a monitoring center (49) which can display the locking and closure status of the individual windows (41) via visual display units (51, 57). The microprocessors (43) are located in the vicinity of the windows (41) and connected to the receiver (61) of a radio-controlled remote control unit by which the windows can be remotely controlled. The windows (41) can also be controlled via an operating unit (65) in the monitoring center (49). The remote control unit may involve either portable transmitters (63) or transmitters with a fixed location (67) which control the windows (41) via sensors (69) as a function of ambient air parameters, such as the relative air humidity, temperature or the $CO_2$ content of the air in the room. The windows (41) have a locking drive integrated in the handle and a separate tilting drive. A central blocking device which blocks the microprocessors (43) permits central blocking of individual windows or of all the windows in the system.

15 Claims, 5 Drawing Sheets

WINDOW SYSTEM FOR A BUILDING

This is a continuation application of Ser. No. 07/522,186, filed May 11, 1990, abandoned.

BACKGROUND OF THE INVENTION

The invention relates to a window system for a building.

Monitoring whether the windows of a building are open or closed is normally a time-consuming matter, particularly in the case of buildings with a large number of windows, such as office buildings, etc. Even if it is possible to see from outside the building whether the windows are open or closed, something which is generally not possible in the case of windows which have merely been pushed to and not locked shut, each window must still be shut and locked individually and manually in the case of conventional window systems.

DESCRIPTION OF THE PRIOR ART

DE-A-32 23 808 describes a window with a manually operated turn-and-tilt lock fitting in which the drive rod arrangement can be opened a slit for ventilation purposes using an electric motor integrated into the handle of the window, when the drive rods are in that position which releases the window about a horizontal axis for tilting. The electric motor drives the drive rod arrangement independently of the handle which is blocked via a torque support. The drive rod arrangement which moves in conventional fashion around the circumference of the vent frame of the window locks the window to the outer frame and also tilts the vent frame into the slightly open ventilation position by means of a wedge-type mechanism acting between the outer frame and the drive rod arrangement. A control system responding to a parameter of the air in the room, such as gaseous or visible impurities, via a sensor is allocated to the electric motor. This control system opens the window automatically if the parameter being monitored exceeds a pre-set value and closes it again when the parameter falls below this value. The energy required for heating and cooling the air in the room can be kept to a minimum using this method.

SUMMARY OF THE INVENTION

It is one objective of the invention to create a window system with increased convenience of operation and/or monitoring, while keeping the expense of installing the window system low.

The invention is particularly suitable for windows with vent frames fitted with a turn-and-tilt lock fitting which can also be operated manually, the fitting being released either about a vertical axis for a turn-and-pivot movement or about a horizontal axis for a tilt-and-pivot movement. The lock fitting is locked and unlocked by a motor arrangement, regardless of whether it can be operated manually or not. The motor arrangement also provides for opening and closing movement of the vent frame, preferably for tilting movement about the horizontal axis. The term "vent frame" here and in the following means the movable wing frame pivoted to a stationary outer frame of the window.

The motor arrangements are controlled by microprocessors which detect the locking status of the lock fitting and/or the closure status of the vent frame via sensor arrangements. Each window is allocated its own microprocessor or as an alternative each microprocessor may also handle the control system for the motor arrangements and signal detection from the sensor arrangements for a group of windows.

The individual microprocessors, which are arranged to be spatially adjacent to the windows to which they are allocated, so as to reduce the amount of cabling required, can also be controlled at a distance from the allocated window via remote control devices. The remote control device makes it possible to operate the window within a room in the building within view of the window, for example, or from a seat from which the window cannot be reached.

Furthermore, the microprocessors should preferably be connected via a data bus, e.g. a ring cable with a common monitoring center accommodated at a distance, the pivoting and/or locking positions of the windows detected via the sensor arrangements being displayed individually or in groups at a visual display unit in this monitoring center. Thus, the data processing capacity of the microprocessors is not used solely for the remote control operation of the motor drives, it is also used for data transfer for monitoring purposes. The program control of the microprocessors synchronises the operating sequence of the motor arrangements, particularly if these have separate motors for the locking drive of the lock fitting and the pivoting drive of the vent frame. The remote control devices thus need to transmit only short trigger signals—an advantage in the case of radio-controlled remote control devices which should preferably have transmitters which are independent of mains power—in order to reduce power consumption. The occupancy of the data connection to the monitoring center can also be limited in terms of time by using the microprocessors situated locally so that the number of microprocessors and windows which can be connected to the monitoring center can be considerably increased. This is particularly advantageous if the monitoring center is also provided with a central operating unit by means of which the windows allocated to the microprocessors can be controlled either selectively and individually or in groups or all together.

In a preferred embodiment, the motor drive includes a locking motor which drives the lock fitting and a separate vent frame pivoting motor which drives the pivoting movement. Separation of the motors has the advantage that conventional turn-and-tilt lock fittings can also be fitted easily and, if necessary, at a later date with a motor drive. The microprocessors switches the motors on in series: for the opening movement it first switches the locking motor in the unlocking direction and then the vent frame pivoting motor in the opening direction; for the closing movement it first switches the vent frame pivoting motor in the closing direction and then the locking motor in the locking direction. It is advisable to allocate limit switches to both the locking motor and the vent frame pivoting motor, the microprocessor responding to these limit switches. In order to rule out entirely the possibility of overlapping turn-on times for the two motors, a preferred embodiment provides for the microprocessor to cause active electrical braking of the motors when the relevant allocated limit switch is actuated, for example by shorting the current leads to the electric motors.

In a preferred embodiment, the microprocessor monitors the current in the electric motors of the motor arrangements. If the motor arrangement is blocked, either accidentally or as a result of attempted sabotage, the motor current starts to rise above a threshold value monitored by the microprocessor. The microprocessor then generates a monitoring signal representing blocking of the motor arrangement, this signal being displayed in the monitoring center with respect either to the window or the group of windows as desired and, where appropriate, used to trigger an alarm. It is advisable for the monitoring signal to be generated only if it occurs for a pre-set period of time, so as to be able to distinguish temporary inhibition of the motor arrangement from actual blocking. After the pre-set period has elapsed, the motor arrangement is switched off to avoid overload damage.

The remote control device connected to the microprocessor may involve wired remote control systems where a control cabinet, or similar, located away from the window is connected to the microprocessor via a connection cable. However it is preferable for the remote control device to function without wires, including a radio transmitter, particularly an infrared transmitter, which controls the microprocessor via a receiver connected to the microprocessor.

In a preferred embodiment of the invention, the central operating device allocated to the monitoring center permits not only selective or collective control of the windows but also selective or collective blocking of the motor arrangements, particularly by means of blocking the microprocessors against control by the remote control devices allocated to the microprocessors. In this way, the windows can be blocked selectively or collectively against remote control operation in order to increase closing security. As this electrical blocking does not affect the manual operation of the lock fitting, the window can still be opened manually in an emergency. The window can also be fitted with alarm contacts which trigger an alarm system via the monitoring center if the window is opened manually in spite of the microprocessor block. However, a blocking device which mechanically blocks the drive rod arrangement of the lock fitting may be provided, either additionally or as an alternative, blocking the drive rod arrangement in its locked position even against manual operation of the lock fitting. In order to increase security against sabotage, it is advisable to provide for the blocking device having a bolt which is spring-mounted and pretensioned in the blocking position and which must be released by excitation of the electromagnet for every unlocking movement of the drive rod arrangement. The excitation of the electromagnet is controlled from the microprocessor so that it, in turn, can be centrally blocked. In order to be able to open the window manually when the system is not centrally blocked, switch contacts may be provided on the handle of the lock fitting to control the electromagnet.

The remote control of the closure status of a window as described above can also be used to control the window with respect to a status parameter of the air in the room in particular, even when no monitoring center is provided for central closure status display or central operation of the windows. This aspect of the invention provides for at least one window with a manually operable lock fitting, preferably designed as a turn-and-tilt fitting. A motor arrangement drives both the lock fitting and the pivoting movement of the window vent frame. The motor arrangement is controlled by a control system which responds to a status parameter, particularly in respect of the ambient air in the building, by means of at least one sensor. The control system includes a first control element connected to the sensor and a radio-operated transmitter via a line connection, and a second control element again connected via a line connection to the motor arrangement and a receiver allocated to the transmitter. Whereas it is advisable for the second control element to be situated close to the window, the first control element may be located at a position suitable for detecting the status parameter, without it being necessary for cables, etc., to be laid to the second control element during installation. In the case of the transmitter, it is again advisable to use an infrared transmitter, preferably a battery-driven infrared transmitter and the second control stage should again preferably be designed as a microprocessor, giving the advantage that the system can be supplemented by a monitoring center and a central operating unit, as described above.

In a preferred embodiment, the sensor in the control unit detects the relative humidity of the ambient air. The rooms of the building may thus be ventilated as a function of the relative humidity, preventing the development of mould, particularly in rooms where there is a risk of damp. Alternatively, or even additionally, sensors may be provided to respond to the temperature or the $CO_2$ content of the ambient air, so that the ventilation of a room is controlled as a function of these parameters. It is advisable for the control to be such that the window is opened if the level of the ambient air parameter detected by the sensor exceeds a first threshold and the window is closed if the level is below a second level which is less than the first threshold. The hysteresis thus caused permits adjustment of the response sensitivity and prevents hunting.

Noise level sensors may be provided in addition or as an alternative to the sensors described above, these sensors responding to the noise level outside the building and closing the window if the noise level is above a pre-set value. This control system for the closing movement of a window depending on noise level can also be designed without a remote control system, since the noise sensor should advisably be located in the vicinity of the window.

Another version which can also be constructed without a remote control unit consists of at least one of the windows being controlled by a sensor which responds to the flow speed of the air in the room, particularly in the vicinity of the window. At least one of the windows can thus be closed automatically in the event of drafts in the room.

A further aspect of the invention involves monitoring the closure status of a number of windows irrespective of whether the windows can be locked and/or pivoted mechanically, although a motor drive for the locking and pivoting movements is preferred in this case as well.

The window system again includes several windows with a manually operable lock fitting, preferably designed as a turn-and-tilt lock fitting, which includes a drive rod arrangement located in a rebated peripheral surface of the vent frame of the window and covered at least in part, which can be moved in the peripheral direction of the vent frame. In this aspect of the invention, the monitoring center displays signals in the visual display unit from position sensor arrangements for the window or for groups of windows, which respond to the instantaneous position of a drive rod arrangement in the lock fitting of the windows. The position sensor arrangements are designed in two parts and consist of a first sensor element with a fixed drive connection to the drive rod arrangement and a second sensor element with a fixed connection to the vent frame or outer frame of the window. This provides the advantage of making available a relatively large installation space along the drive rod arrangement and making it possible to use the relatively large length of stroke of the drive rod arrangement for reliably triggering even comparatively insensitive sensors.

Naturally, this aspect of the invention also involves the central monitoring unit being provided with a visual display device for displaying the closure status of individual windows or groups of windows. In a similar fashion to the versions of the invention described above, the visual display device may involve LEDs allocated to individual windows or individual groups of windows, these LEDs indicating the pivoting status of the window by their signal status. For example, LEDs of different colors may be provided, for instance red for open windows and green for closed windows. The visual display unit may be designed as text display, stating the location and closure status of the window in alphanumeric characters, particularly in those embodiments where the monitoring center is also designed as a computer, for example a PC. Display units with a graphic display, for example in the form of a screen which uses a graphic illustration of the outline of the building to display the window status, are also suitable.

The monitoring center must be able to distinguish between a large number of windows. This may be accomplished, for example, by the individual control units for the windows or window groups, again preferably designed as microprocessors, being polled for the window status using a time-division multiplex method, by calling up the windows or their microprocessors. Alternatively, the microprocessors may also have code addresses allocated which they supply to the monitoring center together with their signals indicating the window status, preferably in a cyclic fashion.

In a particularly simple design of a position sensor arrangement, the first sensor element is designed as a magnet fixed to the drive rod arrangement and movable with this arrangement in the peripheral direction of the vent frame; the second sensor element is a magnetic field sensor and, in particular, a Hall-effect switch. The magnet may be attached to a bolt peg which is present in any case, projecting from the drive rod towards the outer frame, while the magnetic field sensor is located in a locking plate allocated to a bolt peg on the outer frame. The advantage of this embodiment is that it responds only in the event of the window being closed and locked and that it can be created for relatively little structural expense. The magnet is specifically designed to be concealed on the bolt peg so that it cannot be recognized being a component of a position sensor arrangement even when the window is open.

A version in which several position sensor arrangements are provided offers greater security against manipulation. A first position sensor arrangement responds to the closed position of the vent frame, a second to the locked position of the drive rod and a third to the unlocked position of the drive rod which permits the vent frame to pivot. A joint magnet located on the drive rod may be allocated to the second and third position sensor arrangements and the magnetic field sensors may be concealed inside the vent frame so that they cannot be detected even when the window is open. It is advisable to situate the magnets and the magnetic field sensors in the vicinity of the drive rod corner drive lying diagonally opposite the corner bearing of the turn-and-tilt lock fitting in both versions of position sensor arrangements described above. The drive rod corner drive can be provided as a standard component irrespective of the size of the window and is moved out of the frame both during the tilt movement and during the turn movement of the window, so that the position sensor arrangements respond uniformly to both types of pivoting movement.

In another version of a position sensor arrangement, the latter is designed as a push rod contact system, the push rod contact part of which is controlled by the drive rod arrangement via a wedge-type mechanism. The push rod contact part emerges through an aperture in one of the face plates of the lock fitting of the window concealing the drive rod when the window is in the locked position and is drawn back behind the face plate into the vent frame when the window is unlocked and released for pivoting. The drive rod is designed so that it frees the aperture in the face plate only in the locked position and conceals it in the unlocked position. When the window is open, the push rod contact part is thus covered increasing the security of the position sensor arrangement against manipulation.

In one preferred embodiment the push rod contact part is a lever component attached in an articulated manner to the face plate and fitted with a cam surface, this lever acting in conjunction with a cam element attached in a fixed manner to the drive rod. The lever component should advisably be designed as a dual-arm lever, the lever arms of which form cam surface areas at an obtuse angle to one another, so that the cam element controls both directions of movement of the lever component.

In the case of versions in which the drive rod arrangement can be controlled via a motor arrangement as well as manually, limit switches provided on the motor arrangement can also be used as position sensors.

As has already been mentioned, the monitoring center may be designed such that it displays the status of the windows either individually or in groups. In order to place as little load as possible in terms of time on the data connections between the control systems and microprocessors of the individual windows and the monitoring center, the signals from the position sensor arrangements are already linked at the windows in the event of group status display. If microprocessors are provided they can accomplish these links. For the sake of simplicity, however, the individual position sensor arrangements are interlinked in a logical AND circuit, particularly if switching contacts are involved.

As has already been mentioned, the lock fitting of the window, on the one hand, and the pivoting movement of the window, on the other, are best controlled by separate motors. In the case of the drive for a lock fitting which can also be operated manually, as described in DE-A-32 23 808, the electric motor is built into the shank section of a manual turning handle, along the same axis of rotation as the manual turning handle, and drives the driven spindle meshing with the drive rod gearing of the turn-and-tilt lock fitting via toothed gearing. The manual turning handle of the known motor arrangement is thus comparatively large.

The manual turning handle may be designed to be considerably smaller if its gearing, connecting the motor to the driven spindle leading to the drive rod gearing, includes a spindle pinion, the threaded spindle of which, driven by the motor and with its axis transverse to the axis of rotation of the lever handle, is located in the lever direction of this handle and the spindle nut of which is connected to a rack guided in a movable fashion within the lever handle along the threaded spindle, the rack meshing with a pinion located on the driven spindle. In this embodiment it is advisable that the motor is also located along the same axis as the threaded spindle in the lever handle which thus differs from the lever handle of conventional manual turning handles basically only in a somewhat larger diameter. The drive described above for a lock fitting, particularly a turn-and-tilt lock fitting, can also be used in other window systems than those described above.

In the case of the known locking drive, the manual turning handle can be guided and moved axially on a handle base section connected to the vent frame. The torque support is designed as a peg which is lifted out of the handle base section when the manual turning handle is lifted in an axial direction. In an embodiment of this type the pivot bearings of the handle must be designed to be relatively stable and elaborate so that they can stand up to the permanent load. The design expense of the manual turning handle can be reduced if the handle base section attaching the lever handle to the vent frame extends more or less over the whole length of the lever handle and the bolt of the torque support coupling is situated at the free end of the lever handle. At the same time, push rod contacts may be provided at the free end of the lever handle between the lever handle and the handle base section, these contacts drive the motor situated in the lever handle and, if appropriate, its limit switch, with the motor control unit. If the push rod contacts are arranged in several rows running radially to the axis of rotation of the lever handle, each row should be radially offset from the next so that in the event of the lever handle being turned manually the push rod contacts cannot overlap the opposite contacts of other push rod contacts.

Another aspect of the invention concerns the pivot drive of the vent frame which is separate from the locking drive. The pivot drive, like the locking drive described above, can also be built on at a later date to a window fitted with a lock fitting, particularly a turn-and-tilt lock fitting. The pivot drive includes an electric motor accommodated via a support on the outer frame, this motor driving a stay-type lever which is supported in a pivoting fashion on the support of the electric motor on an axis which is basically parallel to the surface plane of the outer frame. The end of the stay-type lever away from the spindle is coupled to a drive rod from the drive rod arrangement of the vent frame via a detachable self-aligning coupling in order to be able to open the vent frame manually independently of the pivot drive. The self-aligning coupling includes a first coupling section in the form of a longitudinally extended rail and a second coupling section in the form of a slide piece guided on and movable along the rail section. The first coupling section is connected in a fixed fashion to the drive rod and in the closed position of the stay-type lever running in the peripheral direction of the outer frame with the lock fitting locked it does not mesh with the second coupling section fitted on the stay-type lever. The coupling conditions are selected such that the coupling sections mesh with one another when the stay-type lever is closed only in the drive rod position for mechanical pivoting operation, for example, the tilt position. Between the tilt position and the locking position of the drive rod, the latter passes through a position in which the window is released for a rotary oscillation. In the turning position the window can be opened manually. If the drive rod fitting is in the tilt position, the two coupling sections of the self-aligning coupling mesh with one another and the window can be mechanically tilted and shut. If the locking drive described above is used, the drive rod fitting can be moved both by the motor and manually so that if the coupling sections are dimensioned appropriately the window can also be opened manually in an emergency, at least in the closed position. The two coupling sections may consist of a mushroom design on the stay-type lever and a guide rail extending along the drive rod with a cross-section which is basically C-shaped, such as is also used for self-aligning couplings in the conventional stay-type fittings of turn-and-tilt lock fittings.

Particularly slim embodiments of the pivot drive are obtained if the gearing linking the motor to the stay-type lever is designed as a spindle drive with a threaded spindle extending in the peripheral direction of the outer frame and driven by the electric motor and a spindle nut flexibly connected to the stay-type lever and at a distance from the pivoting axis of this lever. It is advisable for the spindle nut to be guided along opposite walls of a housing surrounding the electric motor and the spindle drive, the spindle of the stay-type lever passing through a recess, for example an elongated hole in the spindle nut, and being attached to the housing on either side of the spindle nut. The fact that the spindle is supported on both sides permits mechanically stable designs. The pivot drive described above can also be used in other window systems than those described above.

The various features of novelty which characterize the invention are pointed out with particularity in the claims annexed to, and forming part of this disclosure. For a better understanding of the invention, its operating advantages and specific objects attained by its use, reference should be had to the accompanying drawings and descriptive matter in which there are illustrated and described preferred embodiments of the inventions.

BRIEF DESCRIPTION OF THE DRAWINGS

The invention will be explained in more detail below using a drawing. The figures show the following.

DESCRIPTION OF THE PREFERRED EMBODIMENTS

Figure 1:
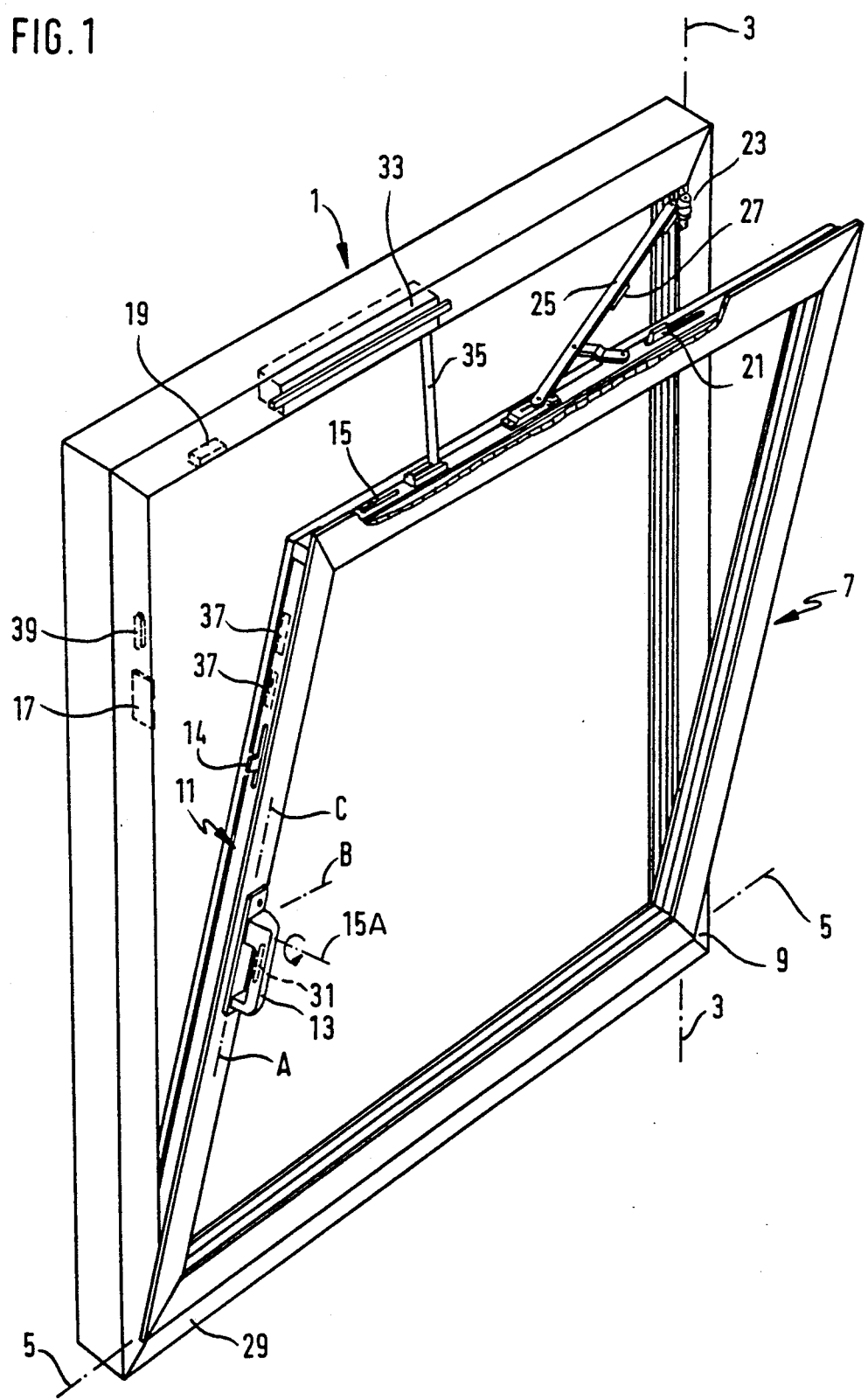
FIG. 1 a perspective representation of a window fitted with a turn-and-tilt lock fitting in the tilted open position.

The window of a building shown in FIG. 1 consists of a stationary outer frame 1 located in a vertical plane and a wing frame or vent frame 7 which can be either turned about a lateral vertical axis 3 or tilted about a lower horizontal axis 5 on the frame 1. The vent frame 7 is supported at one bottom corner by a corner bearing 9 which is not shown in any greater detail and is locked at the outer frame 1 by a drive rod arrangement 11 laid within a rebated that is a rabbeted, recessed or grooved peripheral surface of the vent frame 7 and at least partially concealed and switched between tilting and turning operation. The drive rod arrangement 11 is moved by means of a manual turning handle 13, which is supported in a rotating fashion about an axis of rotation 15A which is perpendicular to the plane of the vent frame 7, in the peripheral direction by means of drive rod gearing which is not shown in any greater detail. The drive rod arrangement 11 basically encloses the whole vent frame 7 in a ring and is fitted with several bolt pegs distributed in a peripheral direction, two of which are shown as 14 and 15. The bolt pegs 14, 15 engage in the locking plates 17, 19 when the window is shut and locked, these locking plates being embedded in the rebated internal surface of the outer frame 1. When the window is shut and locked, the manual turning handle 13 assumes the position A shown in FIG. 1 from which it can be turned through a turned open position B to a tilted open position C. In the turned open position B, a bolt peg 21 located on the drive rod arrangement 11 locks a tilt arm 25 attached to the outer frame 1 via a pivot bearing 23 and the bolt peg 21 engages in a counter-element 27 of the tilt arm 25. The vent frame 7 fixed by the corner bearing and the hinge 23 can thus be rotated about the axis of rotation 3.

In the tilted open position C, the bolt peg 21 is moved out of the counter-element 27 of the tilt arm 25 and the drive rod arrangement 11 has locked a tilting bearing 29 situated diagonally opposite the pivot bearing 23. The vent frame 7 guided along the hook-out arm 25 can thus be tilted about the tilting axis 5.

The window described so far has been of conventional design. However, the window is additionally fitted with a locking drive 31 integrated in the manual turning handle 13; this drive will be explained in more detail below in the context of FIGS. 6 to 8. This drive can move the drive rod arrangement 11 from a drive rod position allocated to locking position A to the drive rod position allocated to tilted open position C, independently of the manual turning of the manual turning handle 13 to the position of the manual turning handle 13 shown in FIG. 1. Furthermore, a tilt drive 33 is located on the upper horizontal side of the outer frame 1, which can be coupled via a stay-type lever 35, which can be driven in a pivoting fashion, with the drive rod arrangement 11 of the vent frame 7 and which moves the vent frame 7 in the tilt direction independently of the manual turning handle 13 when the drive rod arrangement 11 is in the tilted open position. Details of the tilt drive will be given below in the description of FIGS. 9 to 11. The window also consists of at least one position sensor arrangement comprising two sensor elements 37, 39 allocated to one another which detect the locked position of the drive rod arrangement 11 and/or the closed and tilted open position of the vent frame 7. Details of the position sensor arrangements will be given below in the description of FIGS. 3 to 5.

In order to monitor the locking and closure status and to control the locking and tilt drives of a number of windows 41 in accordance with FIG. 1, microprocessors 43 are provided in the immediate vicinity of the windows 41, each of these microprocessors controlling either a single window 41 or a group of spatially adjacent windows 41, for example in the same room of the building. The microprocessors 43 are connected via connection lines 45 with the position sensor arrangements, the locking drives and the tilt drives of the windows 41 allocated to them. The microprocessors 43 are in turn connected via a data ring cable 47 to a spatially remote monitoring center 49 in which the locking and closure status of the individual windows is displayed visually so that the locking and closure status of all the windows of the building can be monitored from a central point. The data ring cable 47 may consist of the mains power supply of the building to which the microprocessors 43 and the monitoring center are linked via data coupling stages. The data ring cable 47 may however also be formed by an additional cable installed in the building. A diode matrix 51 may be provided for the visual display of the locking and closure status of the windows 41, this matrix signalling the locking and closure status for each individual window or for each group of windows by means of LEDs 53. LEDs of different colors, such as green and red, may be used to display the closed and locked status on the one hand and the unlocked or open status on the other. The microprocessors 43 supply the locking and closure status data to the monitoring center 49 in a serial operation controlled by a control unit 55 in the monitoring center 49. The microprocessors 43 may be polled using a cyclic time-division multiplex method; however, address codes to identify the microprocessors 43 and their allocated windows 41 may also be transmitted together with the status information. It is advisable that the control system 55 be a computer, particularly in the event of a large number of windows having to be monitored, this computer also being able to undertake additional control and monitoring measures, such as the central control of the windows 41 or a graphic representation of the locking and closure status of the windows via a monitor 57 which displays the status data regarding the windows visually in text form and/or in a graphic representation using a plan of the building. The control system 55 designed in the form of a computer can also be used for remote data transmission via suitable interface circuits 59.

The locking and closure status of the windows 41 can be remote controlled from within the area in which they are located without having to approach the window to be opened or closed. For this purpose a remote control receiver 61 is connected to the microprocessor 43, this receiver responding to a radio-operated remote control transmitter 63. The remote control transmitter 63 which should preferably be an infrared transmitter is equipped with control keys for controlling the status of the windows 41 connected to the microprocessor 43. When the control command to open one of the windows is transmitted, the microprocessor 43 first switches on the locking drive of the window in the unlocking direction and after unlocking the window moves the tilt drive in the opening direction. When a closing command is given, the tilt drive is first moved in the closing direction and the locking drive is then switched on in the locking direction. Both the locking drive and the tilt drive are fitted with limit switches to which the microprocessors 43 respond in order to prevent both drives being switched on simultaneously. Since under some circumstances the drives have a relatively long run-on time, a useful feature is provided in that the microprocessor 43 shorts the electric motors of the drives via suitable output circuits when the limit switches of the drives respond, thus providing active electrical braking.

The microprocessors also monitor the level of the drive current of the electric motors. The rated current of each electric motor occurring during normal operation increases sharply when the motor is blocked. The microprocessor compares the current level with a pre-set current threshold value and generates a monitoring signal representing the blocking of the electric motor when the threshold value is exceeded. The monitoring center, controlled by the microprocessor 43, visually displays the occurrence of the monitoring signal on the diode matrix 51 or the monitor 57 and, if appropriate, triggers an alarm system. Monitoring the current of the electric motors means that not only is accidental blocking of the window detected, caused for example by an object being trapped between the outer frame 1 and vent frame 7, but sabotage attempts where the window is intentionally prevented from closing are also detected. Since it is possible in individual instances during operation for the motor current to rise even after only temporary inhibition, caused for example by a stiff vent frame, it is useful for the microprocessor 43 to monitor the duration of the excess current as well. The monitoring signal representing the blocked status is not passed to the monitoring center 49 until it has occurred continuously for a pre-set period of time. This makes it possible to avoid false alarms. The microprocessor 43 also switches off the motor running with excess current during the pre-set period and thus prevents damage to the motor as a result of overload.

The windows 41 can also be remotely controlled outside the area in which they are located from a central operating unit 65 in the monitoring center 49. The operating unit 65 is designed so that it permits both specific control of individual windows by the specific selection of the allocated microprocessor 43 and also collective control of groups of windows, for instance those of one floor or one room, and collective control of all the windows by actuating special keys provided for this purpose. Addressing the microprocessors 43 is, in turn, achieved in accordance with the cyclic polling scheme for the control unit 55 or via address codes allocated specifically to the microprocessors and windows.

In addition to or as an alternative to the local control of the microprocessors 43 by remote control transmitters 63 which are usefully portable, other remote control transmitters 67 with a fixed location, particularly, again, infrared transmitters, may also be provided. These are connected to a sensor 69 which responds to a status parameter of the ambient air and controls the open status of the windows connected to the allocated microprocessor 43 as a function of the detected value of the ambient air parameter. The sensor 69 may for example be a sensor detecting relative air humidity, which opens the window when the air humidity value exceeds a pre-set threshold value. This prevents the development of mould, etc., in rooms where there is a risk of damp. The window is closed when the humidity falls below the threshold value once again. In order to introduce a hysteresis property to the control system, the threshold value controlling the closing movement should preferably be slightly lower than the threshold value provided for opening the window. Alternatively or in addition to the humidity sensor, other sensors may be provided which respond for example to the room temperature or the $CO_2$ level of the ambient air and ensure that the window is automatically opened or closed when pre-set values for these parameters are exceeded. Another measure to increase the operating convenience of the window system may provide for the sensor 69 to respond to the noise level outside the building so that the window is automatically closed in the event of road traffic or aircraft noise, for example. Finally, as a further measure to increase the comfort in the building, a sensor 71 responding to the flow speed of the air in the vicinity of a window may be connected to the microprocessor or, if appropriate, to the remote control transmitter 67, controlling the window as a function of drafts.

Figure 2:
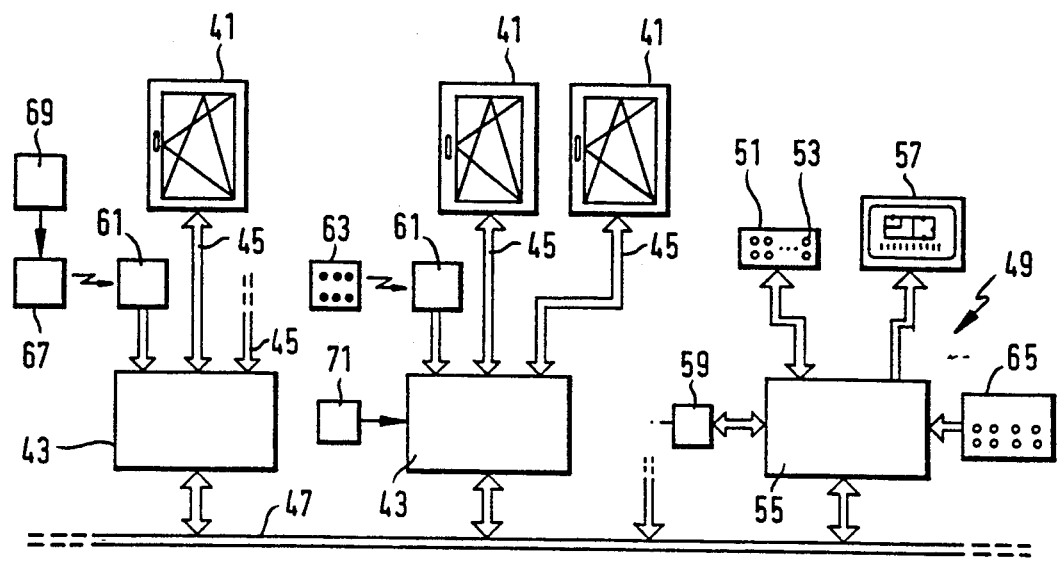
FIG. 2 a block diagram of a window system for a building set up using windows in accordance with FIG. 1.
Figure 3:
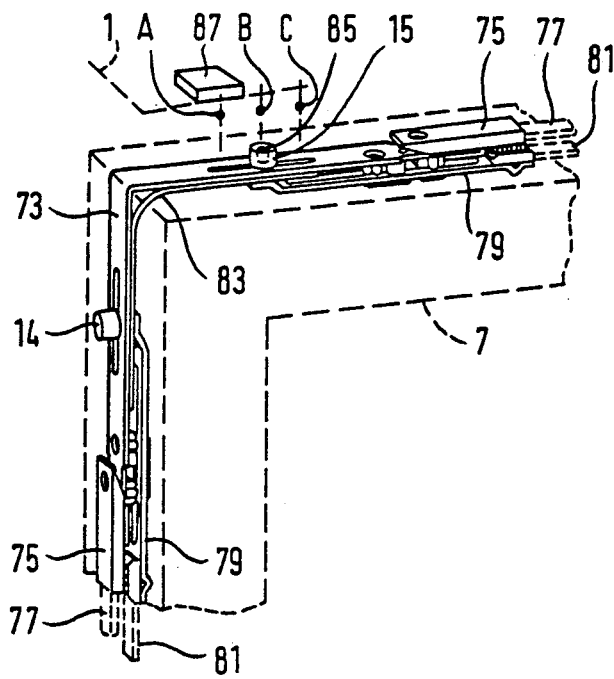
FIGS. 3 and 4 perspective representations of magnetic position sensor arrangements for detecting locking and closure status of a window in accordance with FIG. 1.
Figure 5:
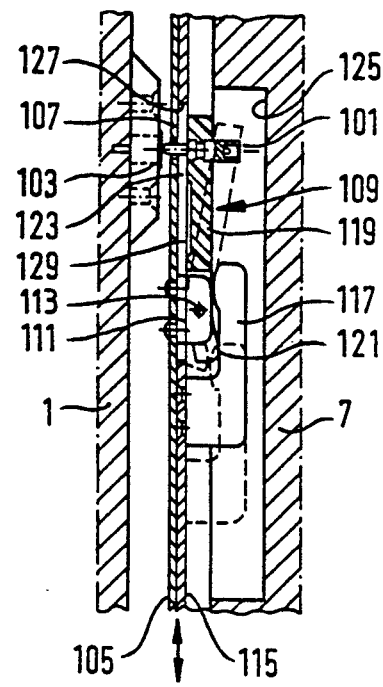
FIG. 5 a sectional view of a push rod contact position sensor arrangement for a window in accordance with FIG. 1.
Figure 4:
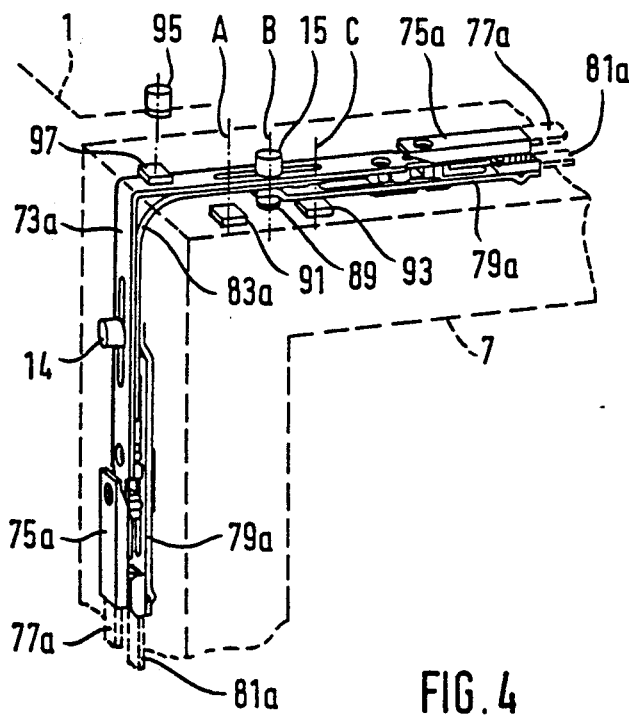

FIGS. 3 to 5 show different versions of position sensor arrangements such as can be used to monitor the locking and closure status of a window in accordance with FIG. 1 used in a system according to FIG. 2. FIG. 3 shows a corner drive for a drive rod arrangement with a face plate angle piece 73 fitted at both ends with connection pieces 75 for extension pieces to face plates 77. Connection pieces 79 are guided along the sides of the face plate angle 73 for drive rods 81 which can be moved in the direction of the periphery of the vent frame 7, these drive rods being coupled together in the vicinity of the corner of the face plate angle 73 by a flexible steel band 83. The connection pieces 79 carry bolt pegs 14, 15 for engaging in the locking plate pieces 17, 19 of the outer frame 1 in FIG. 1. The drive rods 81 and thus the bolt pegs 14, 15 can be moved between a locking position A, a turned open position B and a tilted open position C corresponding to positions A, B and C of the manual turning handle 13 in FIG. 1, this movement can be achieved both by turning the manual turning handle 13 and by means of the locking drive 31. A permanent magnet 85 is concealed, i.e. not visible, in the bolt peg 15 situated in the upper rebated peripheral surface to detect the position, this magnet overlapping a magnetic field sensitive sensor, such as a Hall-effect switch 87, in locking position A when the window is closed. The Hall-effect switch 87 thus responds only when the window is closed and locked and does not respond if one of these two conditions is not met. The signals from the Hall-effect switch 87 form the status data displayed by the monitoring center and are also used to control the locking drive 31 and the tilt drive 33 by means of the microprocessor 43.

FIG. 4 shows another version of a position sensor arrangement differing from the arrangement in FIG. 3 solely in the number and mode of arrangement of the sensors. Components with identical action have been given the reference numbers from FIG. 3 and distinguished by the letter a. Refer to the description of FIG. 3 for details. In contrast to FIG. 3, the position sensor arrangement consists of several magnetic field sensors fitted to the vent frame 7, by means of which both the locking position A and the tilted open position C of the drive rods 81a as well as the closed position of the vent frame 7 can each be detected separately. A first permanent magnet 89 is connected to the drive rod connection piece 79a on the inside of the face plate angle 73a and is hence concealed. The position of the magnet is detected by two Hall-effect switches 91 and 93 in the locking position A and the tilted open position C respectively. The turned open position B can be monitored by the logical combination of the output signals from the Hall-effect switches 91, 93. A second permanent magnet 95 is located on the outer frame 1 and is detected when the window is in the closed position by a magnet-sensitive sensor 97, particularly a Hall-effect switch. The signals from the Hall-effect switches 91, 93 and 97 are evaluated in the allocated microprocessor 43 and transmitted to the monitoring center 49 (FIG. 2). A high degree of security against manipulation is achieved as a result of the separate evaluation of the individual drive rod positions and the closed position of the vent frame.

FIG. 5 shows another position sensor arrangement with a comparatively high degree of security against manipulation in the form of a push rod contact 101 located on the vent frame 7 analogously to the sensor element 37 in FIG. 1, this push rod contact having an opposite contact 103 allocated as a second sensor element similar to sensor element 39 in FIG. 1 in the rebated inner surface of the outer frame 1. The push rod contact 101 is covered in the rebated peripheral surface of the vent frame 7 by a face plate 105 and emerges through an aperture 107 in the face plate 105. The push rod contact 101 is attached to a lever element 109 which, in turn, is supported in a pivoting fashion on a bearing block 111 which is connected in a fixed fashion to the face plate 105 about a spindle 113 running roughly perpendicular to the plane surface of the vent frame 7. By pivoting the lever element 109 into the position shown by the broken line in FIG. 5, the push rod contact 101 can be withdrawn completely behind the face plate 105.

The pivoting movement of the lever element 109 is controlled by a cam component 117 which is connected in a fixed fashion to a drive rod 115 from the drive rod arrangement 11, this cam component 117 moving together with the control movement for the drive rod 115 along the lever element 109. The lever element 109 is designed as a dual-arm lever so that it can be controlled positively in both pivoting directions. The lever arm 119 supports the push rod contact 101 and there is a second arm 121 on the opposite side of the spindle 113 to this arm 119. The arms 119, 121 form cam faces inclined towards one another at an obtuse angle and the cam component 117 slides along these. FIG. 5 shows the locking position of the drive rod 115 with the cam component adjacent to the arm 119 and the push rod contact pressing against the opposite contact 103 through an aperture 123 in the drive rod 115 and the aperture 107 in the face plate 105. In the tilted open position of the drive rod 115 the cam component 117 is supported by the arm 121 so that the arm 119 is folded back into a recess 125 in the vent frame 7. The displacement movement of the drive rod 115 which moves the cam component 117 on to the arm 121 also assists the final edge 127, which is at the back in the direction of movement, past the aperture 107 of the face plate 105, so that the aperture 107 in the face plate 105 is covered by the drive rod 115 both in the turned open position and in the tilted open position of the drive rod 115. The push rod contact 101 is thus protected against manipulation in drive rod 115 positions which permit the window to be opened. Although the push rod contact 101 may have spring properties it is advisable to utilize spring properties from the lever element 109 which is made of plastic. The arm 119 is provided with a recess which reduces its cross-section between the push rod contact 101 and the spindle 113 for this purpose.

Figure 6:
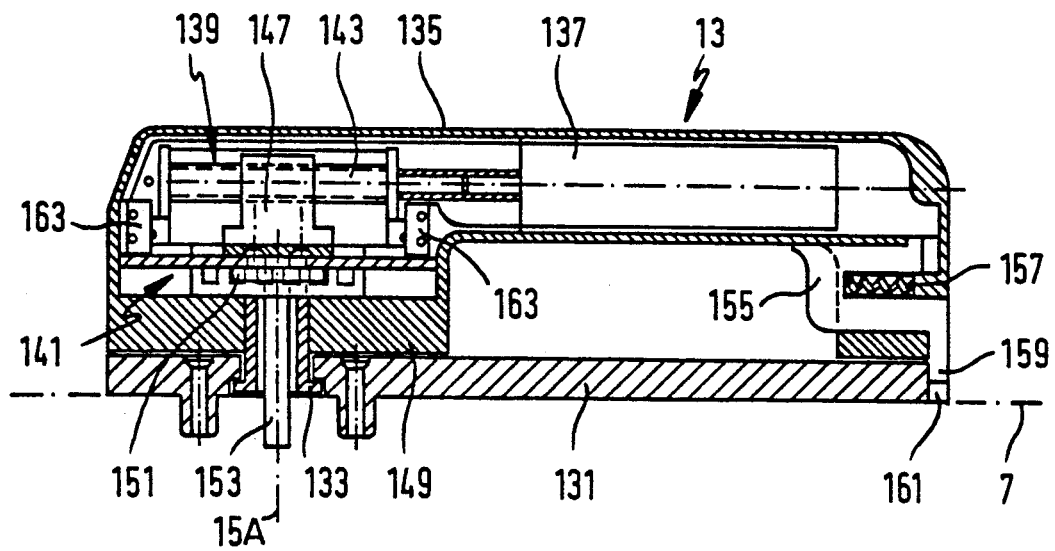
FIG. 6 a longitudinal section through a locking drive integrated in a manual turning handle for a window in accordance with FIG. 1.
Figure 7:
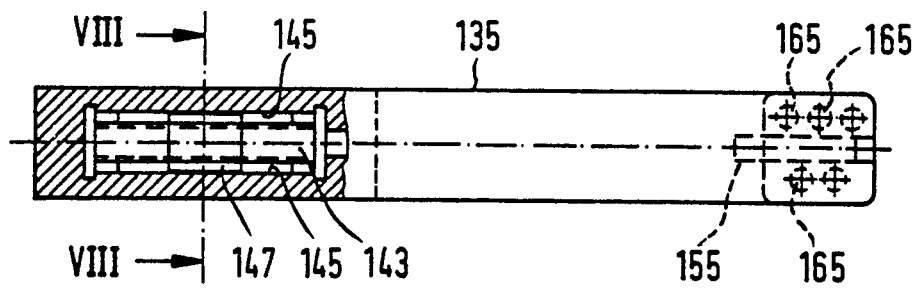
FIG. 7 a partially opened up top view on to the manual turning handle from FIG. 6.
Figure 8:
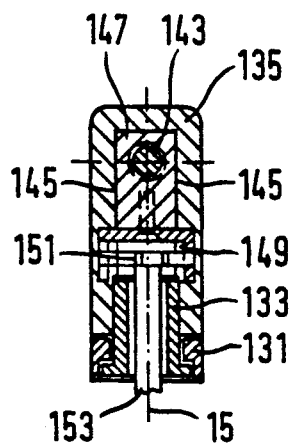
FIG. 8 a cross-section through the manual turning handle seen along a line VIII—VIII in FIG. 7.
Figure 9:
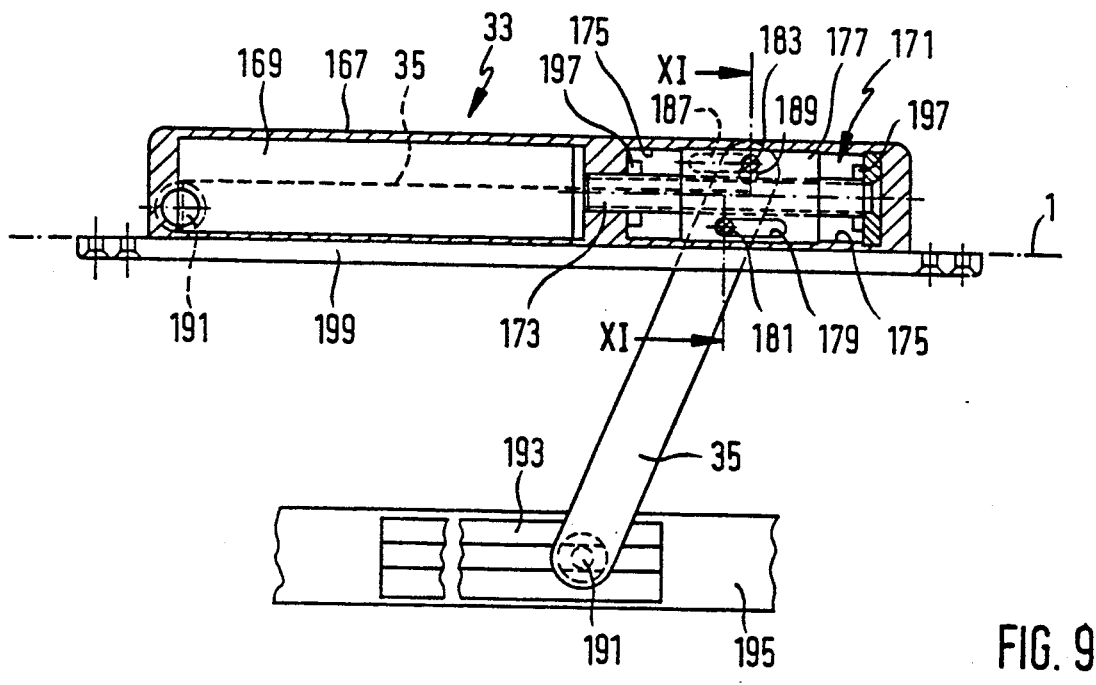
FIG. 9 a partially cut open top view of a vent frame drive in a window in accordance with FIG. 1 with the vent frame tilted.

FIGS. 6 to 8 show design details of the manual turning handle 13 from FIG. 1. The manual turning handle 13 consists of a base section 131 which can be conventionally screwed on to the vent frame 7 and which supports a lever handle 135 in a rotating fashion about the axis 15 on a bush 133. The lever handle 135 forms a housing for the locking drive 31 which consists of an electric motor 137, a spindle pinion 139 and toothed gearing 141. The spindle pinion 139 has a threaded spindle 143 running in the longitudinal direction of the lever handle 135, this threaded spindle being driven by the electric motor 137 which is located along the same axis. The threaded spindle 143 cuts the axis 15A and carries a spindle nut 147 which cannot be twisted about the two opposing housing walls 145 but is guided in a movable manner and which has a rack rail 149 attached, for example bolted on, parallel to the threaded spindle 143. The rack rail which moves with the spindle nut 147 meshes with a pinion 151 which is situated at the engaging end of a square spike 153 with the same axis as the axis of rotation 15 and cannot be turned. The square spike 153 engages in a manner which is not shown in greater detail and so that it cannot be turned in the drive rod gearing which moves the drive rod arrangement 11. At the end of the lever arm 135 furthest from the axis of rotation a finger key 155 is fitted on the lever handle 135 which can be moved in the longitudinal direction of the lever handle and which is pre-loaded by a pressure spring 157 with its bolt projection 159 into a recess 161 in the base section 131. The finger key 155 forms a torque support for the reaction torque exerted on the lever handle 135 during the motor drive of the spike 153 by the electric motor 137. Since the spindle pinion 139 has self-inhibiting properties, the lever handle 135 can also be turned manually together with the spike 153 after the finger key 155 has been pressed and the bolt projection 159 has disengaged. This means that the window can be independently manually locked and unlocked with the spindle pinion in any position, which is particularly important in the event of emergencies.

Two limit switches 163 are allocated to the spindle pinion 139 in the two opposite limit positions of the spindle nut 147 to control the electric motor 137. In the system as shown in FIG. 2 the limit switches 163 are connected to the microprocessors 43. The microprocessor cannot use the limit switches 163 to control the electric motor 137, in particular to apply active electrical braking, but it can use them as a position sensor arrangement to monitor the position of the drive rod arrangement, since when the drive rod arrangement is driven by the motor the lever handle 135 engages with the base section 131 in its rest position thus taking up a pre-set position. The connection lines to the limit switches 163 and the electric motor 137 are guided via spring-mounted push rod contacts 165 in the vicinity of the free end of the lever handle 135 away from the axis of rotation from the lever handle 135 to the base section 131. As can be seen from FIG. 7, the push rod contacts 165 are arranged in two rows basically running in the longitudinal direction of the lever handle 135 and mutually offset from one row to the next so that when the lever handle 135 is rotated they move in different orbits and cannot accidentally come into contact with one another.

Figure 10:
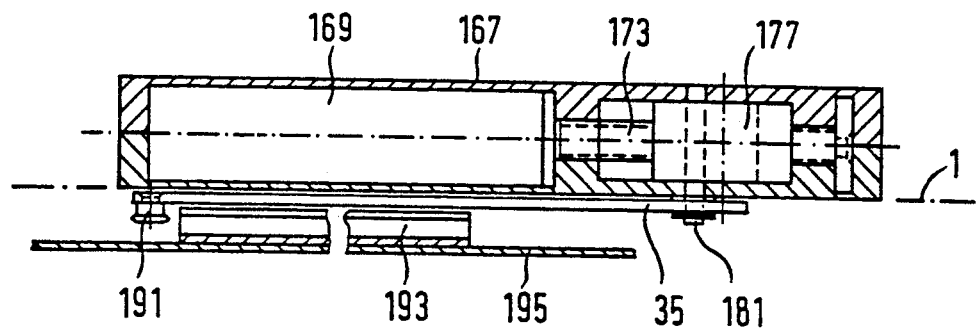
FIG. 10 a vertical section through the vent frame tilt drive in accordance with FIG. 9 with the vent frame closed.
Figure 11:
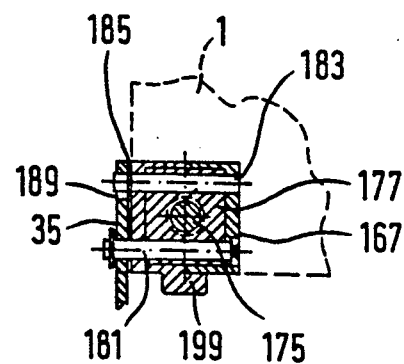
FIG. 11 a cross-section through the vent frame tilt drive, viewed along a line XI—XI in FIG. 9, and FIG. 12 a sectional view of an electromagnetic blocking device for a window in accordance with FIG. 1.

Because of the arrangement of electric motor and spindle pinion along the same axis the manual turning handle 13 described above has relatively small dimensions in the longitudinal direction of its lever handle. The tilt drive 33 shown in detail in FIGS. 9 to 11 has similarly small dimensions. The tilt drive 33 has a two-part housing 167 with a rectangular cross-section, which is inserted to seal flush with the front and grooved inner surfaces of a corner recess in the outer frame 1. The housing 167 extending in the peripheral direction of the outer frame 1 contains an electric motor 169 and a spindle pinion 171 driven by the motor 169, these lying adjacent to one another in a longitudinal direction along the same axis. The spindle pinion has a threaded spindle 173 driven by the motor 169, which acts as a seat for a spindle nut 177 which is guided between opposite walls 175 of the housing 167 and cannot be turned but can be moved in the direction of the axis. The stay-type lever 35 is mounted in a pivoting fashion outside the housing 167 on a spindle bolt 181 which passes through a slot 179 in the spindle nut 177 and is held in the housing 167 on both sides of the spindle nut 177. The spindle bolt 181 runs perpendicular to the longitudinal direction of the upper side of the outer frame 1 and parallel to the plane surface of the outer frame 1. The spindle nut 177 also holds another spindle bolt 183 which is held axially between the stay-type lever 35 and the housing 167 by a retaining ring 185 (FIG. 11) and which emerges from the housing 167 through a slot 187 running through the spindle nut 177 in the direction of displacement (FIG. 9) and engages in a slot 189 extending along the stay-type lever 35. The free end of the stay-type lever 35 carries a mushroom bolt 191 which engages in a guide rail 193 extending along the upper side of the vent frame when the vent frame is tilted. The guide rail sits firmly on a drive rod 195 and together with the mushroom bolt 191 forms a self-aligning coupling by means of which the pivoting movement of the stay-type lever 35 driven by the motor 169 is converted to a tilting movement of the vent frame. The guide rail 193 has a basically C-shaped cross-section and its guide channel takes up the wider head of the mushroom bolt 191 at an undercut angle. The length and position of the guide rail 193 in relation to the drive rod 195 is designed such that the mushroom bolt 191 lies outside the guide rail 193 both in the locked position and in the turned open position of the drive rod 195 if the stay-type lever 35 is in its position parallel to the drive rod 195 corresponding to the window being closed, as shown in FIG. 10. With the stay-type lever 35 of the tilt drive 33 in this position the drive rod 195 can be opened manually by manually moving the manual turning handle 13 (FIG. 1) to the turned open position B, for example if there is a defect in the tilt drive or in an emergency. If the window is to be tilted mechanically, the drive rod 195 is moved via the locking drive 31 into the tilted open position in which the guide rail 193 takes up the mushroom bolt 191.

Two limit switches 197 which can be actuated by the spindle nut 177 are in-turn allocated to the spindle pinion, these switches being connected in a manner which is not shown in more detail to the allocated microprocessor 43 (FIG. 2) by means of connection lines. The microprocessor 43 controls the operation of the electric motor 169 as a function of the actuation of the limit switches 197 and, in particular, controls the electrically active braking operation of the motor as a function of the limit switches 197. In addition, the two limit switches 197 can be used again here as position sensors for the tilt position of the vent frame.

The housing 167 for the tilt drive 33 is fastened in the recess in the outer frame 1 by a mounting flange 199 which is centrally shaped to the housing 167. The mounting flange 199 is symmetrically located in the axial direction of the spindle bolts 181, 183 and the spindle bolts are located interchangeably on the housing 167. The tilt drive 33 can therefore be used equally well for left or right-hand windows.

Windows need to be capable of being blocked for some applications so that they cannot be opened at least via the locally allocated remote controls. The system according to FIG. 2 provides for the microprocessors 43 of the individual windows 41 or the groups of windows allocated to the microprocessors 43 being blocked selectively or collectively in groups or in total via the operating installation 65 of the monitoring centre 49, so that they cannot execute control commands reaching them from the remote control receivers 61 or other control devices. The blocking commands are best linked to closing and locking commands so that the block occurs when the windows are closed and locked. The purely electrical blocking of the electrical window operation has the advantage that in an emergency situation the windows can continue to be opened manually.

Figure 12:
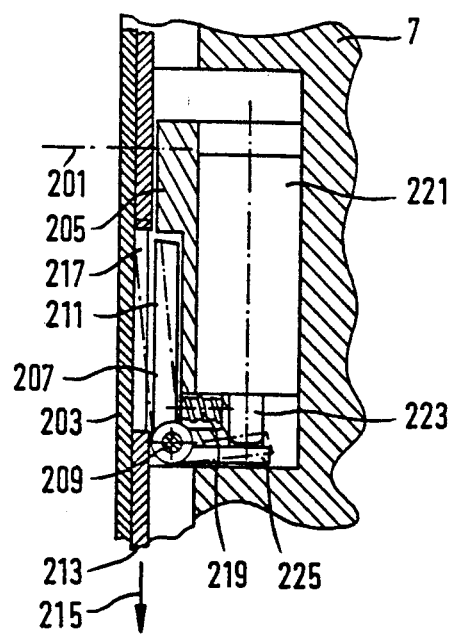

FIG. 12 shows a version which permits mechanical blocking of the drive rod arrangement 11 (FIG. 1) in addition to or as an alternative to the electrical blocking described above. The blocking device according to FIG. 12 consists of a support section 205 connected to a face plate 203 of the drive rod arrangement at 201 in a manner which is not shown in greater detail, an angle catch 207 being pivot-mounted on this support about a spindle 209 running perpendicular to the place surface of the vent frame 7. The angle catch 207 has a catch arm 211 which basically projects from the spindle 209 parallel to a drive rod 213 of the drive rod arrangement against the direction of the opening movement (arrow 215) of the drive rod 213. A recess 217 is provided in the drive rod 213 at a position corresponding to the locking position of the drive rod 213 with the catch arm 211, in which the catch arm 211 is pre-tensioned by a pressure spring 219 attached to the support 205, as shown by a dotted outline in FIG. 12. The catch arm 211 thus blocks the drive rod 215 automatically in its locking position and must be actively moved out of the block position for the lock fitting to be moved to the turned open position or the tilted open position. An electromagnet 221 is provided on the support 205 for unlocking the blocking device, the anchor push rod 223 of this electromagnet supported in a movable fashion parallel to the drive rod 215 pivoting the angle catch 207 against the force of the spring 219 via its actuating arm 225 which runs at right angles to the catch arm 211. The electromagnet 221 is excited via the microprocessors 43 (FIG. 2) together with the locking drive. If the microprocessors 43 are electrically blocked by means of the operating unit, so that they are unable to execute local commands, the electromagnet 221 is not excited and the drive rod arrangement of the window is blocked even for manual unlocking. Switch contacts can be provided on the manual turning handle 13, for example, in order for it still to be possible to open the window manually when the microprocessors are not blocked, these switch contacts closing the excitation circuit of the electromagnet 221 when the lock fitting is actuated manually.

While specific embodiments of the invention have been shown and described in detail to illustrate the application of the inventive principles, it will be understood that the invention may be embodied otherwise without departing from such principles.

What we claim is:

1. Window system for a building with several windows (41) each comprising an outer frame (1) and a vent frame (7) mounted to pivot on the outer frame (1), each window having a manually operable lock fitting (11, 25), in particular a turn-and-tilt lock fitting releasing the vent frame (7) either about a vertical axis (3) for a turning pivoting movement or about a horizontal axis (5) for a tilting pivoting movement, and a motor arrangement (31, 33) driving both the lock fitting (11, 25) and the vent frame (7) in its pivoting movement, and with a control system (43, 49) for the motor drive (31, 33), wherein each window (41) is equipped with a sensor arrangement (37, 39; 85, 87; 89-97; 101, 103; 163; 197) detecting the pivoting position of the vent frame (7) and/or the locking position of the lock fitting (11, 25), wherein a microprocessor (43) is allocated and situated in the vicinity of each window (41) or each group of spatially adjacent windows (41), the microprocessor being connected to the sensor arrangement (37, 39; 85, 87; 89-97; 101, 103; 163; 197) and the motor arrangement (31, 33) of each of the windows (41) allocated to it, wherein the microprocessor (43) is connected to a remote control device (61, 63, 67) by means of which the motor arrangement (31, 33) of each of the windows (41) allocated to the microprocessor (43) can be controlled at a distance from the microprocessor, and wherein several of the microprocessors (43) are connected in particular via a control circuit, and in particular a ring circuit (47), to a joint monitoring center (49) located at a distance from them, on which the pivoting and/or locking positions of the windows (41) detected using the sensor arrangements (37, 39; 85, 87; 89-97; 101, 103; 163; 197) can be displayed either individually or in groups using a visual display unit (51, 57), the motor arrangement (31, 33) comprises a locking motor (31) driving the lock fitting (11, 25) and a separate vent frame pivoting motor (33) driving the pivoting movement, in particular the tilting pivoting movement, of the vent frame (7) and wherein the microprocessor (43) switches on the motors (31, 33) of the motor arrangement (31, 33) in series, with the locking motor (31) in the unlocking direction first followed by the vent frame pivoting motor (33) in the opening direction for the opening movement and with the vent frame pivoting motor (33) in the closing direction followed by the locking motor (31) in the locking direction for the closing movement.

2. Window system in accordance with claim 1, wherein both the locking motor (31) and the vent frame pivoting motor (33) have limit switches (163, 197) allocated to them which detect the locking position and the unlocking position which permits the vent frame (7) to be pivoted, on the one hand, and the closed and open positions of the vent frame (7), on the other, and wherein the microprocessor (43) responds to the limit switches (163, 197) and exerts active electrical braking on each of the individual motors (31, 33) when the allocated limit switch (163, 197) is actuated.

3. Window system in accordance with claim 1, wherein a central operating unit (65) is connected to the monitoring center (49), this in turn being controllable via a remote control unit (59), in particular a radio-controlled remote control unit, a remote data transmission unit or a voice control unit.

4. Window system in accordance with claim 1, wherein each motor arrangement (31, 33) is allocated an over-current monitoring circuit (43) which generates a monitoring signal representing the blocking of the motor arrangement (31, 33) if a pre-set value for the motor current is exceeded and wherein the monitoring center displays the occurrence of the monitoring signal selectively allocated to the window (41) or group of windows (41).

5. Window system in accordance with claim 4, wherein the over-current monitoring circuit (43), in particular a microprocessor (43), generates the monitoring signal if the preset value of the motor current is exceeded for a preset period monitored by the over-current monitoring circuit and switches off the motor arrangement (31, 33) after the preset period has elapsed.

6. Window system for a building with several windows (41) each comprising an outer frame (1) and a vent frame (7) mounted to pivot on the outer frame (1), each window having a manually operable lock fitting (11, 25), in particular a turn-and-tilt lock fitting releasing the vent frame (7) either about a vertical axis (3) for a turning pivoting movement or about a horizontal axis (5) for a tilting pivoting movement, and a motor arrangement (31, 33) driving both the lock fitting (11, 25) and the vent frame (7) in its pivoting movement, and with a control system (43, 49) for the motor drive (31, 33), wherein each window (41) is equipped with a sensor arrangement (37, 39; 85, 87; 89-97; 101, 103; 163; 197) detecting the pivoting position of the vent frame (7) and/or the locking position of the lock fitting (11, 25), wherein a microprocessor (43) is allocated and situated in the vicinity of each window (41) or each group of spatially adjacent windows (41), the microprocessor being connected to the sensor arrangement (37, 39; 85, 87; 89-97; 101, 103; 163; 197) and the motor arrangement (31, 33) of each of the windows (41) allocated to it, wherein the microprocessor 943) is connected to a remote control device (61, 63, 67) by means of which the motor arrangement (31, 33) of each of the windows (41) allocated to the microprocessor (43) can be controlled at a distance from the microprocessor, and wherein several of the microprocessors (43) are connected in particular via a control circuit, and in particular a ring circuit (47), to a joint monitoring center (49) located at a distance from them, on which the pivoting and/or locking positions of the windows (41) detected using the sensor arrangements (37, 39; 85, 87; 89-97; 101, 103; 163; 197) can be displayed either individually or in groups using a visual display unit (51, 57), the remote control unit (61, 63, 67) comprises a radio-controlled transmitter (63, 67), in particular an infrared transmitter, and a receiver (61) connected to the microprocessor (43) in particular an infrared receiver, the monitoring center (49) includes a central operating unit (65) by means of which the motor arrangements (31, 33) of the windows (41) or groups of windows (41) allocated to the microprocessors (43) can be selectively controlled in the locking position against control via the remote control units (61, 63, 67) allocated to the microprocessors (43), wherein the lock fitting consists of a drive rod arrangement (11) laid in a rebated peripheral surface of the vent frame (7) and movable in the direction of the periphery of the vent frame (7), wherein a blocking device (207, 221) blocking the drive rod arrangement (11) in its locking position is provided on the vent frame, the blocking device (207, 221) comprising a bolt (207) pre-tensioned by a spring (219) into its blocking position and an electromagnet (221) working against the force of the spring (219) releasing the drive rod arrangement (11), and wherein the electromagnet (221) can be excited via the microprocessor (43,), wherein the bolt is designed as a pivoting angle catch (207) mounted on a support section (205) of the blocking device (207, 221) which holds the electromagnet (221), the free end of one of the arms (211) of this angle catch (207) engaging in a recess (217) of a drive rod (215) when the drive rod arrangement (11) is in the locking position, the other arm (225), running transverse to the drive rod (215), being exposed to the action of the electromagnet (221).

7. Window system for a building, comprising several windows (41) each having an outer frame (1) and a vent frame (7) mounted to pivot on the outer frame (1), each window having a manually operable lock fitting (11, 25), in particular a turn-and-tilt lock fitting releasing the vent frame (7) either about a vertical axis (3) for a turning pivoting movement or about a horizontal axis (5) for a tilting pivoting movement, said fitting comprising a drive rod arrangement (11) laid in a grooved peripheral surface of the vent frame, at least partially concealed and movable in the direction of the periphery of the vent frame (7), wherein the drive rod arrangement (11) of each window has a drive connection with a two-part position sensor arrangement comprising a first sensor element (37; 85; 89, 97; 101; 147; 177) and a second sensor element (39; 87; 91, 93, 95; 103; 163; 197) which are connected in a fixed fashion to one of the vent frame (7) and the outer frame (1), respectively wherein the position sensor arrangement generates a first signal upon alignment of its sensor elements and a second signal in the absence of alignment, and wherein the position sensor arrangements of the windows (41) are connected to a joint monitoring center (49) which can display using a visual display unit (51, 57) whether the first or second signal from the position sensor arrangement is present for at least one of the windows (41) with respect to each individual window (41) or to groups of windows (41), the position sensor arrangement is designed as a push rod contact arrangement (101, 103) with a push rod contact section (101) attached to the vent frame (7) in such a way as to be movable transverse to the peripheral surface of the vent frame (7) and an opposite contact (103) located on the outer frame (1), wherein the push rod contact section (101) is coupled to a drive rod (115) from the drive rod arrangement (11) via a wedge-type mechanism (117, 121) and emerges towards the opposite contact element (103) when the drive rod arrangement (11) is in the locking position through an aperture (107) in a vent frame (7) face plate (105) covering the drive rod (115) and through an aperture (127) in the drive rod (115) which is flush with the face plate aperture (107) when the drive rod (115) is in the locking position, and wherein the push rod contact section (101) is also lifted out of the movement track of the drive rod (115) when the drive rod arrangement (11) is in the unlocking position which permits the vent frame (7) to pivot and that the aperture (127) in the drive rod (115) is of a size such that in the unlocking position it conceals the aperture (107) in the face plate (105), wherein the push rod contact section (101) is located on a lever element (109) running along the face plate (105) and connected by a joint to a spindle (113) roughly parallel to the fax plate (105), and wherein the wedge-type mechanism (117, 121) is formed by a cam surface of the lever element (109) and a cam counter-surface of a cam element (117) connected in a fixed fashion to the drive rod (115), wherein the lever element (109) is designed as a dual-arm lever, in that the cam surface working in conjunction with the cam element (117) extends over both lever arms (117, 119) and in that the cam surfaces of the two lever arms (117, 119) include an obtuse angle.

8. Window system, for a building, comprising several windows (41) each having an outer frame (1) and a vent frame (7) mounted to pivot on the outer frame (1), each window having a manually operable lock fitting (11, 25), in particular a turn-and-tilt lock fitting releasing the vent frame (7) either about a vertical axis (3) for a turning pivoting movement or about a horizontal axis (5) for a tilting pivoting movement, said fitting comprising a drive rod arrangement (11) laid in a grooved peripheral surface of the vent frame, at least partially concealed and movable in the direction of the periphery of the vent frame (7), wherein the drive rod arrangement (11) of each window has a drive connection with a two-part position sensor arrangement comprising a first sensor element (37; 85; 89, 97; 101; 147; 177) and a second sensor element (39; 87; 91, 93, 95; 103; 163; 197) which are connected in a fixed fashion to one of the vent frame (7) and the outer frame (1), respectively wherein the position sensor arrangement generates a first signal upon alignment of its sensor elements and a second signal in the absence of alignment and wherein the position sensor arrangements of the windows (41) are connected to a joint monitoring center (49) which can display using a visual display unit (51, 57) whether the first or second signal from the position sensor arrangement is present for at least one of the windows (41) with respect to each individual window (41) or to groups of windows (41), the position sensor arrangement is designed as a push rod contact arrangement (101, 103) with a push rod contact section (101) attached to the vent frame (7) in such a way as to be movable transverse to the peripheral surface of the vent frame (7) and an opposite contact (103) located on the outer frame (1), wherein the push rod contact section (101) is coupled to a drive rod (115) from the drive rod arrangement (11) via a wedge-type mechanism (117, 121) and emerges towards the opposite contact element (103) when the drive rod arrangement (11) is in the locking position through an aperture (107) in a vent frame (7) face plate (105) covering the drive rod (115) and through an aperture (127) in the drive rod (115) which is flush with the face plate aperture (107) when the drive rod (115) is in the locking position, and wherein the push rod contact section (101) is also lifted out of the movement track of the drive rod (115) when the drive rod arrangement (11) is in the unlocking position which permits the vent frame (7) to pivot and that the aperture (127) in the drive rod (115) is of a size such that in the unlocking position it conceals the aperture (107) in the face plate (105), wherein the push rod contact section (101) is located on a lever element (109) running along the face plate (105) and connected by a joint to a spindle (113) roughly parallel to the fax plate (105), and wherein the wedge-type mechanism (117, 121) is formed by a cam surface of the lever element (109) and a cam counter-surface of a cam element (117) connected in a fixed fashion to the drive rod (115), wherein the lever element (109) is designed as a dual-arm lever, in that the cam surface working in conjunction with the cam element (117) extends over both lever arms (117, 119) and in that the cam surfaces of the two lever arms (117, 119) include an obtuse angle, wherein the lever element (109) has elastic spring properties in at least one partial section between the push rod contact element (101) and the joint.

9. Window system for a building with a window comprising an outer frame (1) and a vent frame (7) mounted to pivot on the outer frame (1), having a manually operable lock fitting (11, 25), in particular a turn-and-tilt lock fitting releasing the vent frame (7) either about a vertical axis (3) for a turning pivoting movement or about a horizontal axis (5) for a tilting pivoting movement, the lock fitting (11, 25) comprising a drive rod arrangement (11) laid in a rebated peripheral surface of the vent frame (7) and movable in the direction of the periphery of the vent frame (7) and a manual turning handle (13) with a drive connection to the drive rod arrangement (11) via drive rod gearing, the manual turning handle (13) being pivot-mounted on a handle base section (131) attached in a fixed fashion to the vent frame (7), with an electric motor (137) connected to form a single unit with the manual turning handle (13), which drives a driven spindle (153) located in the handle in a rotating fashion relative to the manual turning handle (13) via gearing (139, 141) in the handle which is self-locking on rotation from the power take-off side, the driven spindle (153) being coupled to the drive rod gearing and coaxial with the axis of rotation of the manual turning handle (13), and with a manually detachable torque support coupling (159, 161) between the manual turning handle (13) and the handle base section (131), wherein the manual turning handle is designed as a lever handle (135), wherein the self-locking gearing comprises a spindle pinion (139) with a threaded spindle (143) driven by the motor (137), the axis of which is transverse to the axis of rotation (15A) of the lever handle (135) and located in the longitudinal lever direction of the lever handle (135) and with a spindle nut (147) which is connected to a rack (9) in the lever handle (135) and guided in a movable fashion along the threaded spindle (143) and which meshes with a pinion (151) seated on the driven spindle (153)

wherein the torque support coupling is designed as a bolt (159) guided in a movable fashion on the lever handle (135) and in particular is located at that end of the lever handle (135) away from the axis of rotation, the bolt (159) being connected to a finger key (155).

10. Window system for a building with at least one window comprising an outer frame (1) and a vent frame (7) mounted to pivot on the outer frame (1), having a lock fitting (11, 25) which can be adjusted by at least one of manually and a motor arrangement (31, 33), in particular a turn-and-tilt lock fitting releasing the vent frame either about a vertical axis (3) for a turning pivoting movement or about a horizontal axis (5) for a tilting pivoting movement, the lock fitting (11, 25) comprising a drive rod arrangement (11) laid in a rebated peripheral surface of the vent frame (7) and movable in the direction of the periphery of the vent frame (7), and with pivoting drive (33) for the vent frame (7) attached in a fixed fashion to the outer frame (1) and including an electric motor (169), wherein a stay-type lever (35) is mounted on bearings on a spindle (181) which is basically parallel to the plane surface of the outer frame (1) on a support (167) in the pivoting drive (33) which carries the electric motor (169), this lever (35) being linked at the end away from the spindle (181) with a drive rod (195) from the drive rod arrangement (11) via a detachable self-aligning coupling (191, 193) and being driven by the electric motor (169) via gearing (171) between a position which closes the window, in which the stay-type lever (35) runs basically in the direction of the periphery of the outer frame (1), and a position which opens the window, in which the stay-type lever (35) runs at an angle to the direction of the periphery, wherein the self-aligning coupling (191, 193) comprises a first coupling section (193) in the form of a longitudinally extended rail section and a second coupling section (191) in the form of a slide which can be pushed along the rail section, and wherein one of the coupling sections (191, 193) is connected in a fixed fashion to the drive rod (195) and, when the stay-type lever (35) is in the closed position with the lock fitting (11, 25) locked does not engage with the other of the two coupling sections (191) attached to the stay-type lever (35) and engages with the other coupling section (191) only in the drive rod position designed for mechanical pivoting operation, wherein the gearing is designed as a spindle drive (171) with a threaded spindle (173) extending in the direction of the periphery of the outer frame (1) and driven by the electric motor (169) and with a spindle nut (177) at a distance from the pivoting axis of the stay-type lever (35) and connected to the latter in a flexible manner, wherein the support is designed as a housing (167) surrounding the electric motor (169) and the spindle drive (171)

wherein the spindle nut (177) is guided along opposite walls of the housing (167) such that it cannot be twisted but can be moved parallel to the spindle wherein the spindle (181) of the stay-type lever (35) passes through an opening (179) in the spindle nut and is attached to the housing (167) on both sides of the spindle nut (177), and wherein the electric motor (169) is attached to the support frame (167) with its shaft on a parallel axis to that of the threaded spindle (173).

11. Window system in accordance with claim 10, wherein one limit switch (197) is located on the support (167) on each of the axially opposite sides of the threaded spindle (173) and can be actuated by the spindle nut (177) to control the electric motor (169).

12. Window system for a building, comprising several windows (41) each having an outer frame (1) and a vent frame (7) mounted to pivot on the outer frame (1), each window having a manually operable turn-and-tilt lock fitting (11, 25) releasing the vent frame (7) either about a vertical axis (3) for a turning pivoting movement or about a horizontal axis (5) for a tilting pivoting movement, said fitting comprising a drive rod arrangement (11) laid in a grooved peripheral surface of the vent frame, at least partially concealed and movable in the direction of the periphery of the vent frame (7), wherein the drive rod arrangement (11) is fitted with at least one bolt peg (15) projecting toward the outer frame (1) and engaging in a locked position of the window in a locking plate (19) associated with the outer frame (1); wherein each window has a position sensor arrangement comprising a magnet (85) attached to the bolt peg (15) and movable with the drive rod arrangement (11) in the direction of the periphery of the vent frame (7), and a magnet field sensor (87), in particular, a Hall-effect switch located on the locking plate (19), said magnetic field sensor (87), in the locked position of the window (41), in response to engagement of the magnet (85) together with the bolt peg (15) in the locking plate (19), generating a first signal, and the magnetic field sensor (85) generating a second signal in a disengaged position of the bolt peg (15); and wherein the position sensor arrangement of each window (41) is connected to a joint monitoring center (49) which can display using a visual display unit (51, 57) whether the first or second signal is present for each individual window (41) or groups of windows (41).

13. Window system in accordance with claim 12, in which the lock fitting (11, 25) comprises a corner bearing (9) which guides the vent frame (7) during the turn-and-tilt movement and which is situated diagonally opposite a drive rod corner drive (79, 83) in the vicinity of an upper corner of the vent frame (7),
wherein the position sensor arrangement (85, 87) is fitted in the vicinity of the drive rod corner drive (79, 83) diagonally opposite the corner bearing (9).

14. Window system for a building, comprising several windows (41) each having an outer frame (1) and a vent frame (7) mounted to pivot on the outer frame (1), each window having a manually operable lock fitting (11, 25), in particular a turn-and-tilt lock fitting releasing the vent frame (7) either about a vertical axis (3) for a turning pivoting movement or about a horizontal axis (5) for a tilting pivoting movement, said fitting comprising a drive rod arrangement (11) laid in a grooved peripheral surface of the vent frame, at least partially concealed and movable in the direction of the periphery of the vent frame (7),
wherein each window (41) is provided with several position sensor arrangements of which a first position sensor arrangement (95, 97) responds to the locked petition of the vent frame (7), a second position sensor arrangement (89, 91) responds to the locking position of the drive rod arrangement (11), and a third position sensor arrangement (89, 93) responds to the unlocking position of the drive rod arrangement (11) which permits the pivoting movement of the vent frame (7), each of the first, second and third arrangements comprising a magnet (89, 95) and a magnet field sensor, in particular, a Hall-effect switch (91, 93, 97) generating, upon alignment with the magnet, a first signal, and a second signal in the absence of alignment;
wherein at least one of the position sensor arrangements of each window (41) is connected to a joint monitoring center (49) which can display using a visual display unit (51, 57) whether the first or second signal is present for each individual window (41) or groups of windows; and
wherein the magnetic field sensors of the second (89, 91) and third position sensor arrangements are located within the vent frame (7), and the magnets of the second (89, 91) and third (89, 93) position sensor arrangement are formed by a common magnet (89) attached to the drive rod arrangement (11) and displaceable therewith in the direction of the periphery of the vent frame (7).

15. Window system in accordance with claim 14, in which the lock fitting (11, 25) comprises a corner bearing (9) which guides the vent frame (7) during the turn-and-tilt movement and which is situated diagonally opposite a drive rod corner drive (79, 83) in the vicinity if an upper corner of the vent frame (7),
wherein the several position sensor arrangement (89-97) are fitted in the vicinity of the drive rod corner drive (79, 83) diagonally opposite the corner bearing (9).

* * * * *